United States Patent
Fragniere et al.

(10) Patent No.: US 12,115,582 B2
(45) Date of Patent: Oct. 15, 2024

(54) MANUFACTURING CHAMBER FOR AN ADDITIVE MANUFACTURING MACHINE

(71) Applicant: AddUp, Cebazat (FR)

(72) Inventors: Bruno Fragniere, Clermont-Ferrand (FR); Albin Effernelli, Cebazat (FR); Gilles Walrand, Cebazat (FR)

(73) Assignee: ADDUP, Cebazat (FR)

( * ) Notice: Subject to any disclaimer, the term of this patent is extended or adjusted under 35 U.S.C. 154(b) by 212 days.

(21) Appl. No.: 17/413,014

(22) PCT Filed: Dec. 12, 2019

(86) PCT No.: PCT/FR2019/053045
§ 371 (c)(1),
(2) Date: Jun. 11, 2021

(87) PCT Pub. No.: WO2020/120912
PCT Pub. Date: Jun. 18, 2020

(65) Prior Publication Data
US 2022/0063000 A1    Mar. 3, 2022

(30) Foreign Application Priority Data

Dec. 12, 2018 (FR) ...................................... 1872769

(51) Int. Cl.
*B22F 12/70* (2021.01)
*B22F 10/28* (2021.01)
(Continued)

(52) U.S. Cl.
CPC .............. *B22F 12/70* (2021.01); *B22F 10/28* (2021.01); *B22F 10/322* (2021.01); *B22F 12/30* (2021.01);
(Continued)

(58) Field of Classification Search
CPC ................................. B22F 12/70; B33Y 30/00
See application file for complete search history.

(56) References Cited

U.S. PATENT DOCUMENTS 10,926,327 B2    2/2021  Sutcliffe et al.
2017/0120330 A1* 5/2017  Sutcliffe ................. B22F 12/70
(Continued)

FOREIGN PATENT DOCUMENTS

JP    2014-104489 A    6/2014
WO   2015/189619 A1   12/2015

OTHER PUBLICATIONS

International Search Report dated Apr. 1, 2020, from corresponding PCT/FR2019/053045 (4 pages).

*Primary Examiner* — Farah Taufiq
(74) *Attorney, Agent, or Firm* — VENABLE LLP

(57) ABSTRACT

A manufacturing chamber for an additive manufacturing machine comprises in an enclosure: a working plane; a manufacturing platform for the deposition of the layers of additive manufacturing material and for supporting the part being manufactured; and a circuit for circulating an inert gas flow over the manufacturing platform, characterized in that the enclosure and/or the working plane comprises an inlet opening for the gas flow, in that the working plane comprises an upstream ramp, connected to the area of the working plane where the manufacturing platform is located by a surface having a rounded convex profile, and in that the surface with a rounded convex profile is configured for attaching the gas flow, by the Coanda effect, above the working plane.

17 Claims, 5 Drawing Sheets

(51) Int. Cl.
  *B22F 10/322*   (2021.01)
  *B22F 12/00*    (2021.01)
  *B22F 12/30*    (2021.01)
  *B22F 12/33*    (2021.01)
  *B33Y 30/00*    (2015.01)

(52) U.S. Cl.
  CPC .............. *B22F 12/33* (2021.01); *B22F 12/38* (2021.01); *B33Y 30/00* (2014.12); *B22F 2201/10* (2013.01)

(56) References Cited

U.S. PATENT DOCUMENTS

2020/0061653 A1* 2/2020 Wakelam .............. B05B 12/087
2023/0043535 A1   2/2023 Effernelli

* cited by examiner

MANUFACTURING CHAMBER FOR AN ADDITIVE MANUFACTURING MACHINE

FIELD OF THE INVENTION AND PRIOR ART

The present invention relates to the general field of selective additive manufacturing.

More particularly, it relates to a manufacturing chamber for an additive manufacturing machine.

Selective additive manufacturing consists in creating three-dimensional objects by consolidating selected regions in successive layers of powdered material (metallic powder, ceramic powder, etc.). The consolidated regions correspond to successive cross sections of the three-dimensional object. Consolidation takes place, for example, layer by layer, through total or partial selective fusing carried out using a consolidation source (a high-power laser beam, an electron beam, or other).

Conventionally, an additive manufacturing apparatus comprises, in a fixed manufacturing chamber:
- a vertically movable platform on which the different layers of additive manufacturing powder are successively deposited,
- one or more energy beam sources controlled for selectively scanning the powder bed,
- a powder supply reservoir,
- a tool such as a scraper or a roller, which moves in translation over the powder bed to spread the powder.

Conventionally, a flow of inert gas is provided over the movable platform, for discharging the fumes and projections resulting from the fusion of the powders. This inert gas flow prevents the fumes and projections from interfering with the energy beam. This flow also helps to prevent these fumes and projections from soiling or obstructing the window through which the energy beam enters the manufacturing chamber.

However, the configurations proposed up to the present time for such fume discharge mechanisms are not wholly satisfactory.

GENERAL INTRODUCTION TO THE INVENTION

One object of the invention is to overcome the drawbacks of the additive manufacturing chambers known from the prior art, particularly for platforms of large dimensions.

Notably, the invention proposes a solution for discharging the fumes and projections resulting from the fusion of the powders, while causing the least possible disturbance to the powder deposited in layers.

Accordingly, the invention proposes a manufacturing chamber for an additive manufacturing machine, comprising in an enclosure:
- a working plane;
- a manufacturing platform for the deposition of the layers of additive manufacturing material and for supporting the part being manufactured, said platform being moved in vertical translation with respect to the working plane as the deposition and fusion of the layers of additive manufacturing powder proceed,
- a circuit for circulating an inert gas flow over the manufacturing platform, characterized in that the enclosure and/or the working plane comprises an inlet opening for the gas flow, the geometry of this opening enabling the gas flow to be injected into the enclosure,
in that the working plane comprises, upstream of the manufacturing platform with respect to the direction of circulation of the gas flow, an upstream ramp, connected to the area of the working plane where the manufacturing platform is located by a surface having a rounded convex profile,
and in that the surface with a rounded convex profile is configured for attaching the gas flow, by the Coanda effect, above the working plane, said gas flow thus circulating, preferably, in the form of a laminar flow over said working plane.

Such a configuration can ensure that the inert gas circulates above the manufacturing platform and the working plane, preferably in a laminar flow.

This ensures that metal vapours and any projections are discharged by a grazing flow which is free of turbulence and therefore prevents the powders in position from being blown about.

Such a configuration is also advantageously supplemented by the following various characteristics, considered alone or in any technically feasible combination thereof:
- the inlet opening directs the gas flow tangentially to the upstream ramp;
- the inlet opening is a slot extending along a main direction perpendicular to the direction of circulation of the gas flow;
- the slot of the inlet opening extends over at least the width of the manufacturing platform inside the enclosure;
- the surface with a rounded convex profile has a constant radius of curvature;
- a portion of the inlet opening comprises a cutout arranged in the lateral wall of the enclosure;
- the surface with a rounded convex profile has a radius of curvature of between 300 mm and 1700 mm, for example equal to 1500 mm;
- the surface with a rounded convex profile has different radii of curvature or a variable radius of curvature, the variations of which conform to a specified function;
- The upstream ramp is inclined with respect to the plane of the platform at an angle of between 10° and 90°, for example between 15° and 25°, for example equal to 20°;
- the enclosure and/or the working plane comprises, downstream of the platform, an outlet opening through which the gas flow is drawn;
- downstream of the manufacturing platform, the surface of the working plane is parallel to the surface of the manufacturing platform as far as the outlet opening;
- the working plane comprises, downstream of the manufacturing platform with respect to the direction of circulation of the gas flow, a downstream ramp, connected to the area of the working plane where the manufacturing platform is located by a surface having a rounded convex profile, and the outlet opening is configured for drawing the gas flow tangentially to said downstream ramp.

The invention also relates to an additive manufacturing machine comprising a manufacturing chamber of the aforesaid type.

DESCRIPTION OF THE FIGURES

Other characteristics and advantages of the invention will become more apparent from the description which follows, which is purely illustrative and non-limiting, and should be read with reference to the appended figures, in which.

DETAILED DESCRIPTION OF THE INVENTION

General Provisions

Figure 1:
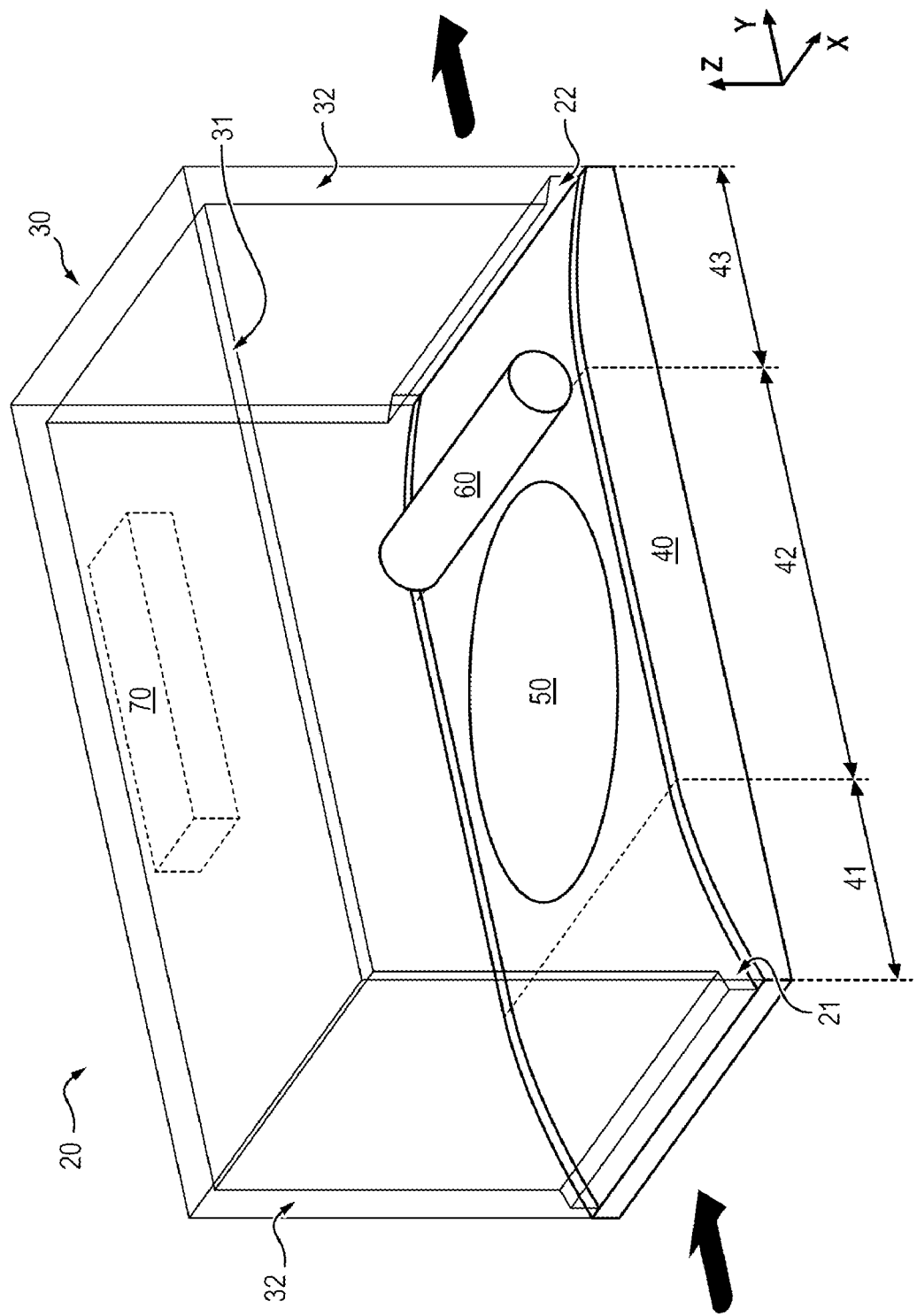
FIG. 1 is a schematic view of an additive manufacturing machine according to the invention.

With reference to FIG. 1, the additive manufacturing machine 10 comprises a manufacturing chamber 20.

In a conventional manner, the manufacturing chamber 20 comprises an enclosure 30 defined by a working plane 40, lateral walls 32 which surround said working plane 40, and a top cover 31 which closes the enclosure 30 while allowing the passage of the energy beam. The walls 32 and the cover 31 are, for example, made of metal. The working plane 40 is, for example, made of metal.

The manufacturing chamber 20 also comprises a manufacturing platform 50 for receiving the various successive layers of additive manufacturing powder and for supporting a part during its manufacture.

This platform 50 has a working surface with suitable characteristics of flatness and surface state for additive manufacturing. Preferably, the platform 50 also has mechanical strength characteristics enabling it to support a part weighing several tens, or even hundreds, of kilograms. Thus the platform 50 may, for example, be made of metal.

This platform 50 is located in a central area 42 of the working plane 40, said central area 42 having a flat surface.

Typically, this central area 42 may have a length of more than a metre (around 1300 millimetres, for example).

The powder deposition and fusion plane coincides with the plane of this central area 42 throughout the process.

To this end, the platform 50 is moved in translation with respect to the working plane 40 as the deposition and fusion of the layers of additive manufacturing powder proceed.

Notably, in one embodiment, the platform 50 descends as the deposition and fusion of the layers of additive manufacturing powder proceed, whereas the working plane 40 remains stationary.

In a variant, it may be the working plane 40 that is made to move with the enclosure 30, while the platform 50 remains stationary.

The shape of the manufacturing platform 50 may be circular, rectangular, square, triangular, etc. In the case of a circular shape, its diameter is, for example, around 1200 millimetres.

The manufacturing chamber 20 further comprises a carriage 60 moving above the working plane 40 and the platform 50.

Powder is placed or deposited in front of the carriage 60 by a powder distribution device, which may be a slide valve or an injector, or a powder reservoir located above the working plane 40. The carriage 60 may then be used to distribute the powder, on a manufacturing area 51, on the platform 50, or on a preceding layer of powder, for the manufacture of a part.

The carriage 60 may, for example, comprise a scraper or a roller.

The manufacturing chamber 20 further comprises a power supply member 70 for fusing an additive manufacturing powder. The power supply member 70 may, for example, be a laser beam source, an electron beam source, or the like.

Gas Inlet/Gas Outlet

In the remainder of the present description, reference will be made to a right-angled reference frame XYZ. The plane XY is parallel to the surface of the central area 42 of the working plane 40, the X axis forming a transverse axis, the Y axis forming a longitudinal axis parallel to the length of the working plane 40, and the Z axis being a vertical axis.

Figure 2:
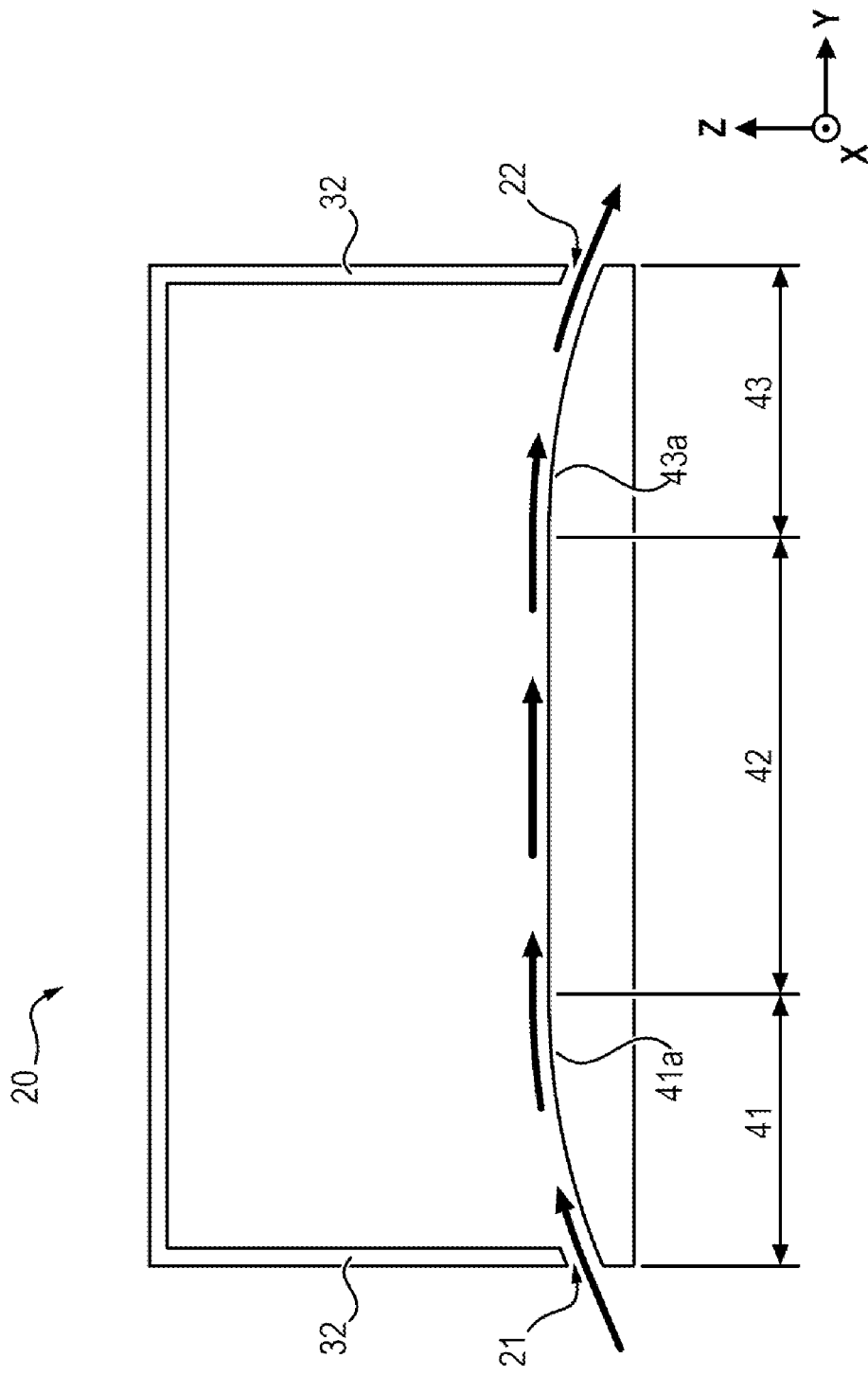
FIG. 2 is a schematic representation of a manufacturing chamber according to an embodiment of the invention.

As shown in FIG. 2, a gas, preferably inert, circulates above the area 42, parallel to the Y axis.

For this purpose, the enclosure 30 comprises a gas inlet and a gas outlet 21, 22. A circuit (not shown) and various pieces of equipment are also provided outside the enclosure 30 for circulating the gas (pipes, circulating pump and filter, for example).

The inert gas is, for example, a nitrogen-based gas, a noble gas (helium, neon, argon, krypton, xenon or radon), or a mixture of some of these gases.

The inlet 21 and the outlet 22 are, for example, openings (notably, slots parallel to the X axis) formed through the walls 32, in the vicinity of the working plane 40.

They may also be formed through the working plane 40 and open inside the enclosure 30 in the immediate vicinity of the walls 32.

They advantageously extend over at least the transverse width of the platform 50 inside the enclosure 30, and preferably over more than the transverse width of the platform 50.

Such a ratio provides the best coverage of the whole surface of the platform 50 and thus the optimal discharge of the fumes and projections arising from the fusion of the powders.

Notably, the geometry of the opening(s) forming the inlet 21 is such that the gas flow is preferably injected into the enclosure in the form of a laminar flow.

The carriage 60 may be positioned perpendicularly to the flow or in another orientation. If the carriage 60 is positioned perpendicularly to the flow as shown in FIG. 1, a retraction position for the carriage may be provided along a lateral wall 32 of the enclosure. In such a retraction position, the carriage is located above the inlet 21 or the outlet 22 and does not interfere with the flow.

To avoid interference with the flow, the carriage 60 may also be positioned parallel to the flow.

The working platform 40 comprises, upstream of the central area 42, an upstream ramp 41, in the immediate vicinity of which the inert gas inlet 21 opens.

Throughout the present text, the terms "upstream" and "downstream" are defined with reference to the direction of the gas flow.

The inlet 21 has a geometry that directs the gas flow onto the upstream ramp 41, preferably tangentially to the latter.

In a variant, the inlet 21 has a geometry that directs the gas flow onto the upstream ramp 41 with an angle of incidence.

At its end opposite the opening 21, the upstream ramp 41 terminates in a linking area 41a, which has a rounded convex geometry and forms a junction with the surface of the central area 42.

Figure 3:
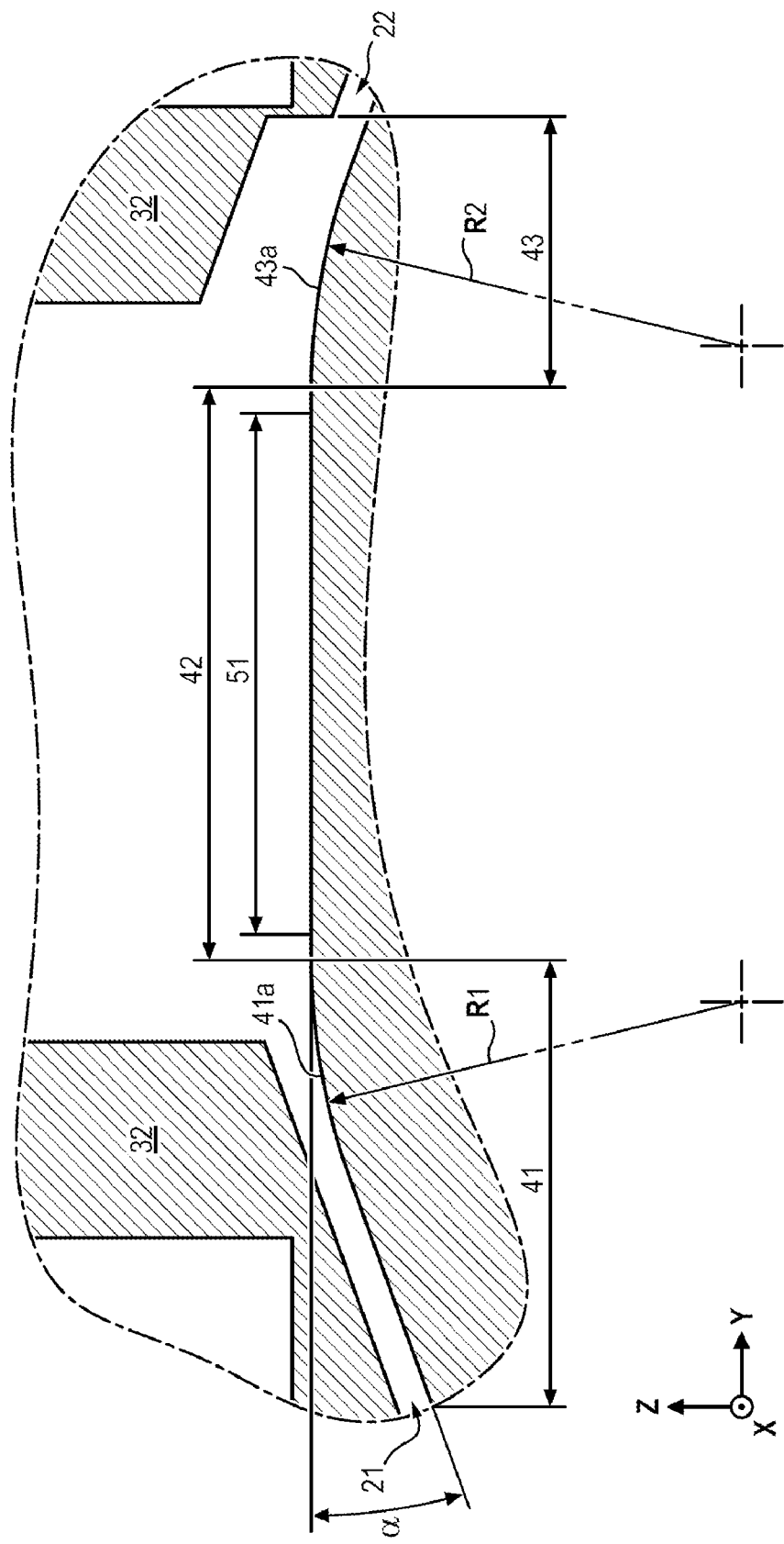
FIG. 3 is a cross-sectional view of a manufacturing chamber according to the embodiment of FIG. 2.

In the embodiment shown more particularly in FIG. 3, the upstream ramp 41 of the working plane 40 is inclined with respect to the plane XY at an angle α of between 10° and 90°, for example between 15° and 25°. The angle α is, for example, equal to 20°.

The radius of curvature R1 of the rounded linking area 41a may be between 300 mm and 1700 mm. It is preferably between 1400 mm and 1600 mm, and is for example equal to 1500 mm.

The rounded linking area 41a may also have different radii of curvature or a variable radius of curvature, the variations of which conform to a specified function.

With such a configuration of the inlet ramp and the rounded linking area, the gas flow directed along the upstream ramp 41 by the inlet 21 is subject to a Coanda effect.

The Coanda effect is improved when the inlet 21 directs the gas flow tangentially onto the upstream ramp 41.

It will be recalled that the Coanda effect is the attraction of a jet of fluid by a convex surface over which it flows.

Because of the rounded convex shape of the rounded linking area 41a, the gas flow is attracted and attached along the area 42 in the direction of the Y axis.

This enables a uniform laminar flow to be maintained over the central area 42, notably when the platform 50 and the working plane 40 have large lengths and widths in excess of 400 mm.

Because of the absence of turbulence, the powders in position are not blown about, while the vapours and impurities put in suspension by the metal fusion are carried away by the gas flow.

As shown in FIGS. 2 and 3, a downstream ramp 43 inclined with respect to the horizontal plane XY may also be provided downstream of the area 42.

The angle of inclination of said downstream ramp 43 may be identical, in absolute terms, to the angle of inclination α of the upstream ramp 41. It may also be different therefrom.

This angle of inclination is, for example, between 10° and 90°, or preferably between 15° and 25°, and is for example equal to 20°.

Additionally, the central area 42 and the downstream ramp 43 of the working plane 40 are connected by a rounded linking area 43a whose radius of curvature R2 may be constant or variable, and between 300 mm and 1700 mm, preferably between 1400 mm et 1600 mm, being for example equal to 1500 mm.

The rounded linking area 43a connecting the central area 42 and the downstream ramp 43 of the working plane 40 may also have different radii of curvature, or a variable radius of curvature whose variations conform to a specified function.

This configuration with a convex profile enables the gas flow to be drawn along while keeping it laminar as a result of the Coanda effect.

This enables a maximum amount of fumes to be discharged toward the gas outlet 22.

The geometry of the outlet 22 preferably enables the gas flow to be drawn tangentially to the downstream ramp 43, thereby further ensuring the absence of interference.

As is also illustrated, the upstream ramp 41 and downstream ramp 43 are framed by the outer and inner faces (relative to the enclosure 30) and the lower face of the lateral wall 32 adjacent to a ramp, thus enabling the incoming/outgoing flow, respectively, to be contained.

Figure 4:
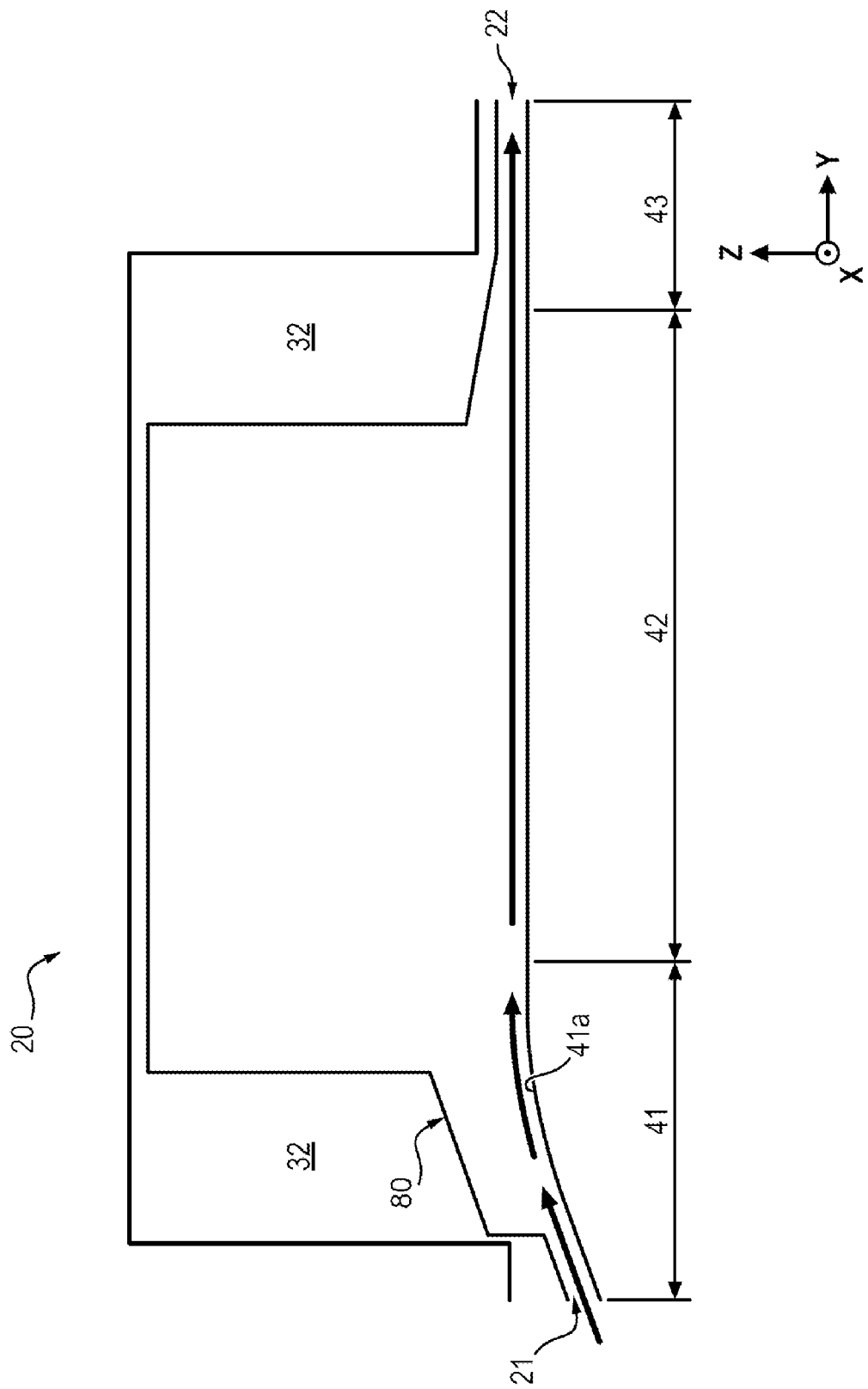
FIG. 4 is a schematic representation of a manufacturing chamber according to another embodiment of the invention.

Other variant embodiments are possible. Notably, as shown in FIG. 4, the working plane 40 may not have a downstream ramp. In this example, the central part 42 is prolonged by a downstream area 43 whose surface is in the same plane as the surface of the central part 42. The outlet 22 draws parallel to this plane.

Thus the flow circulates in the continuation of the surface of the central area 42 without interference.

As also illustrated, a portion of the inlet opening 21 may comprise a cutout 80 arranged in the lateral wall 32 of the enclosure 30. This cutout 80 enables the cross section of the inlet opening 21 to be enlarged above the ramp 41. Said cutout 80 may be used to prevent the adhesion of the gas flow to the lower face and to the inner face of the lateral wall 32 framing the upstream ramp 41, thus preserving the Coanda effect on the gas flow between said upstream ramp 41 and the working plane 40.

Figure 5:
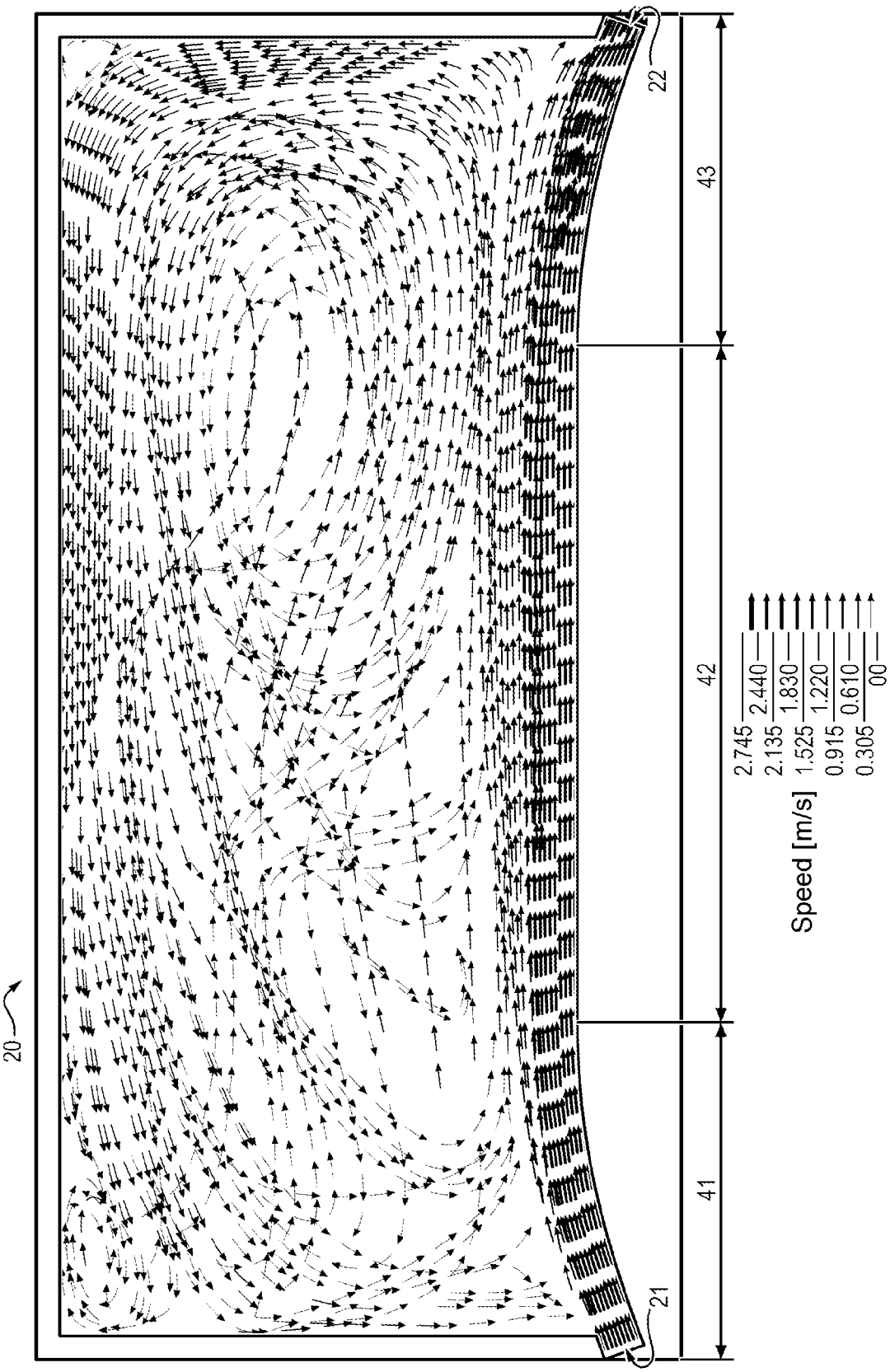
FIG. 5 is a graph on which are plotted the speeds of the gas flow in a manufacturing chamber of the type shown in FIG. 2.

FIG. 5 shows a simulation of the gas flow above the working plane 40.

As may be seen in this figure, the gas flow remains laminar at the upstream ramp 41 and at the central part 42 of the working plane 40.

It has a relatively constant speed over the whole length of the area 42.

As may also be observed, there is a "boundary layer", where the flow speed at the level of the powder is practically zero, in the proximity of the powder bed (around 1 mm from the bed). The flow speed also increases rapidly with height (from several millimetres upward) to reach the nominal speed of the gas flow. Such conditions are ideal for carrying away a maximum amount of fumes without damaging the powder bed.

For example, the speed of the gas flow circulating in the immediate proximity of the manufacturing platform surface is between around 1.220 and around 1.525 m/s.

Also, for example, the speed of the gas flow circulating a few millimetres from the manufacturing platform surface is between around 1.525 and around 2.135 m/s.

The invention claimed is:

1. A manufacturing chamber for an additive manufacturing machine comprising an enclosure and comprising, in the enclosure: a working plane; a manufacturing platform for the deposition of layers of additive manufacturing powder and for supporting a part being manufactured, the manufacturing platform being moved in translation with respect to the working plane as the deposition and fusion of the layers of additive manufacturing powder proceed; and a circuit for circulating a gas flow over the manufacturing platform, wherein the enclosure, the working plane, or both the enclosure and the working plane comprises an inlet opening for the gas flow, a geometry of the inlet opening enabling the gas flow to be injected into the enclosure, wherein the working plane comprises, upstream of the manufacturing platform with respect to a direction of circulation of the gas flow, an upstream ramp, connected to an area of the working plane where the manufacturing platform is located by a surface having a rounded convex profile, wherein the inlet opening directs the gas flow onto the upstream ramp, wherein the surface having the rounded convex profile is configured for attaching the gas flow, by the Coanda effect, above the working plane, the gas flow thus circulating in a form of a laminar flow over the manufacturing platform, and wherein the working plane comprises, downstream of the manufacturing platform with respect to the direction of circulation of the gas flow, a downstream ramp, connected to the area of the working plane where the manufacturing platform is located by a surface having a rounded convex profile, so as to form a continuous surface between the working plane and the downstream ramp, wherein the surface having the rounded convex profile has a radius of curvature of between 300 mm and 1700 mm and wherein the upstream ramp is inclined with respect to a plane of the manufacturing platform at an angle of between 10° and 90°.

2. The manufacturing chamber according to claim 1, wherein the inlet opening is a slot extending along a main direction perpendicular to the direction of circulation of the gas flow.

3. The manufacturing chamber according to claim 2, wherein the slot of the inlet opening extends over at least a width of the manufacturing platform inside the enclosure.

4. The manufacturing chamber according to claim 1, wherein the inlet opening directs the gas flow tangentially to the upstream ramp.

5. The manufacturing chamber according to claim 1, wherein a portion of the inlet opening comprises a cutout arranged in a lateral wall of the enclosure.

6. The manufacturing chamber according to claim 1, wherein the surface having the rounded convex profile has a constant radius of curvature.

7. The manufacturing chamber according to claim 1, wherein the surface having the rounded convex profile has different radii of curvature or a variable radius of curvature, variations of which conform to a specified function.

8. The manufacturing chamber according to claim 1, wherein the enclosure, the working plane or both the enclosure and the working plane comprises, downstream of the manufacturing platform, an outlet opening through which the gas flow is drawn.

9. The manufacturing chamber according to claim 8, wherein, downstream of the manufacturing platform, a surface of the working plane is parallel to a surface of the manufacturing platform as far as the outlet opening.

10. The manufacturing chamber according to claim 1, wherein the outlet opening is configured for drawing the gas flow tangentially to the downstream ramp.

11. An additive manufacturing machine comprising the manufacturing chamber according to claim 1.

12. The manufacturing chamber according to claim 1, wherein the upstream ramp of the working plane is inclined with respect to the plane XY at an angle α of between 10° and 90°.

13. The manufacturing chamber according to claim 1, wherein a radius of curvature R1 of the rounded linking area of the upstream ramp is between 300 mm and 1700 mm.

14. The manufacturing chamber according to claim 1, wherein the downstream ramp of the working plane is inclined with respect to the plane XY at an angle α of between 10° and 90°.

15. The manufacturing chamber according to claim 1, wherein a radius of curvature R2 of the rounded linking area of the downstream ramp is between 300 mm and 1700 mm.

16. The manufacturing chamber according to claim 1, wherein the rounded convex profile forms a continuous surface between the working plane and the upstream ramp.

17. A manufacturing chamber for an additive manufacturing machine comprising an enclosure and comprising, in the enclosure: a working plane; a manufacturing platform for the deposition of layers of additive manufacturing powder and for supporting the part being manufactured, the manufacturing platform being moved in translation with respect to the working plane as the deposition and fusion of the layers of additive manufacturing powder proceed; a carriage to distribute the additive manufacturing powder on the manufacturing platform; and a circuit for circulating a gas flow over the manufacturing platform, wherein the enclosure, the working plane, or both the enclosure and the working plane comprises an inlet opening for the gas flow, a geometry of the inlet opening enabling the gas flow to be injected into the enclosure, wherein the working plane comprises, upstream of the manufacturing platform with respect to a direction of circulation of the gas flow, an upstream ramp, connected to an area of the working plane where the manufacturing platform is located by a surface having a rounded convex profile, so as to form a continuous surface between the working plane and the upstream ramp, wherein the inlet opening directs the gas flow onto the upstream ramp; wherein the surface having the rounded convex profile is configured for attaching the gas flow, by the Coanda effect, above the working plane, the gas flow thus circulating in a form of a laminar flow over the manufacturing platform, and wherein the working plane comprises, downstream of the manufacturing platform with respect to the direction of circulation of the gas flow, a downstream ramp, connected to the area of the working plane where the manufacturing platform is located by a surface having a rounded convex profile, so as to form a continuous surface between the working plane and the downstream ramp, wherein the surface having the rounded convex profile has a radius of curvature of between 300 mm and 1700 mm and wherein the upstream ramp is inclined with respect to a plane of the manufacturing platform at an angle of between 10° and 90°.

* * * * *